(12) United States Patent
Hegerath et al.

(10) Patent No.: US 8,397,567 B2
(45) Date of Patent: Mar. 19, 2013

(54) DUAL CLUTCH TRANSMISSION OF REDUCED AXIAL LENGTH AND METHOD OF CONTROLLING THIS DUAL CLUTCH TRANSMISSION

(75) Inventors: Andreas Hegerath, Bergheim (DE); Ulrich Eggert, Viersen (DE); Ingo Steinberg, Cologne (DE); Christian Krauss, Cologne (DE); Wolfgang Brings, Cologne (DE)

(73) Assignee: Getrag Ford Transmissions GmbH, Cologne (DE)

( * ) Notice: Subject to any disclaimer, the term of this patent is extended or adjusted under 35 U.S.C. 154(b) by 485 days.

(21) Appl. No.: 12/639,898

(22) Filed: Dec. 16, 2009

(65) Prior Publication Data

US 2010/0154584 A1 Jun. 24, 2010

(30) Foreign Application Priority Data

Dec. 23, 2008 (DE) .................. 10 2008 063 014

(51) Int. Cl.
*F16H 3/08* (2006.01)
(52) U.S. Cl. ............................. 73/330; 74/333
(58) Field of Classification Search ............ 74/330, 74/333
See application file for complete search history.

(56) References Cited

U.S. PATENT DOCUMENTS

| | | | |
|---|---|---|---|
| 7,246,536 B2* | 7/2007 | Baldwin | 74/340 |
| 7,748,286 B2* | 7/2010 | Baldwin | 74/330 |
| 7,950,302 B2* | 5/2011 | Burgardt et al. | 74/331 |
| 8,151,662 B2* | 4/2012 | Fitzgerald et al. | 74/330 |

FOREIGN PATENT DOCUMENTS
EP 1637770 3/2006

* cited by examiner

*Primary Examiner* — Ha D. Ho
(74) *Attorney, Agent, or Firm* — Schlee IP International, P.C.; Alexander R. Schlee

(57) ABSTRACT

A dual clutch transmission comprising a first partial transmission and a second partial transmission is provided. A first group of forward gears is allocated to the first partial transmission, a second group of forward gears is allocated to the second partial transmission, each one of the forward gears comprises a particular transmission ratio, two adjacent forward gears comprise adjacent transmission ratios with no transmission ratio of any other forward gear in between, and at least two adjacent forward gears are allocated to the second partial transmission. Further, such a control method for controlling the dual clutch transmission is provided that a torque transmitting gap is closed when gear shifting between the aforementioned two adjacent gears.

7 Claims, 2 Drawing Sheets

DUAL CLUTCH TRANSMISSION OF REDUCED AXIAL LENGTH AND METHOD OF CONTROLLING THIS DUAL CLUTCH TRANSMISSION

CROSS REFERENCE TO RELATED APPLICATION

This application claims the priority right from the German patent application DE 102008063014.4 that was filed on Dec. 23, 2008, the content of which is herewith incorporated in its entirety by reference.

BACKGROUND OF THE INVENTION

The invention relates to a dual clutch transmission comprising a first partial transmission and a second partial transmission, wherein a first group of forward gears is allocated to the first partial transmission and a second group of forward gears is allocated to the second partial transmission.

Dual clutch transmissions are used increasingly in motor vehicles. One advantage offered by dual clutch transmissions is the ability of shifting gears between two adjacent forward gears without interruption in the driving power. Two adjacent forward gears are defined as comprising transmission ratios where no transmission ratio of any other forward gears is in between. For achieving gear shifting without interruption in the traction force a first forward gear, third forward gear and a fifth forward gear are for example allocated to the first partial transmission, while the second forward gear, the fourth forward gear and the sixth forward gear are allocated to the second partial transmission. When shifting gears for example from the third forward gear into the fourth forward gear, it is for instance possible by an appropriate design to provide during the transition phase a torque transmission of both clutches of the dual clutch transmission during the transition period of shifting gears from the third into the fourth forward gear. This requires, however, that the adjacent gears are allocated to different partial transmissions.

The fixed allocation of the first group of forward gears to a partial transmission and of the second group of forward gears to the other partial transmission makes it more difficult to modify or supplement the dual clutch transmission. Therefore, it is generally not possible to configure by simple modifications of an existing dual clutch transmission a new dual clutch transmission. The described fixed allocation of the forward gears to the respective partial transmission may therefore require a completely new gear wheel set for adding another forward gear to the dual clutch transmission and therefore requires major efforts. These efforts might increase further for creating a new gear wheel set if the packaging of the motor vehicle allows only for a limited space for the dual clutch transmission. This is in particular the case in motor vehicles where the motor is installed in a transverse direction where the axial installation height is critical.

SUMMARY OF THE INVENTION

It is therefore an object of the invention to create a dual clutch transmission comprising a simple design and providing a low axial installation height.

This is achieved by a dual clutch transmission comprising a first partial transmission; and a second partial transmission, wherein a first group of forward gears is allocated to the first partial transmission, a second group of forward gears is allocated to the second partial transmission, each one of the forward gears comprises a particular transmission ratio, two adjacent forward gears comprise adjacent transmission ratios with no transmission ratio of any other forward gear in between, and at least two adjacent forward gears are allocated to the second partial transmission.

According to the present invention, the aforementioned object is further achieved by a method for controlling the aforementioned dual clutch transmission, the method comprising selecting between a first gear shifting control mode for shifting gears from one gear allocated to the first partial transmission into a first one of the two adjacent forward gears allocated to the second partial transmission, and a second gear shifting control mode shifting gears from one gear allocated to the first partial transmission into a second one of the two adjacent forward gears allocated to the second partial transmission.

According to the present invention, the aforementioned object is further achieved by a method for controlling the aforementioned dual clutch transmission, the method comprising shifting gears from a first one of the two adjacent forward gears into the second one of the two adjacent forward gears; and providing a torque in at least one of a) the first partial transmission, b) an output shaft provided downstream from the first and second partial transmissions, and c) a gear shifting clutch of the second partial transmission.

DETAILED DESCRIPTION OF THE INVENTION

The dual clutch transmission according to a present invention allocates at least to the second partial transmission at least two adjacent forward gears. This changes the typically fixed allocations of the forward gears to the respective partial transmissions, typically allocating the even numbered gears to one partial transmission and the odd numbered gears to the other partial transmission. This means that according to the invention two adjacent forward gears are both allocated to the second partial transmission, the forward gears comprising adjacent transmission ratios where no intermediary transmission ratio from any other forward gear lies in between. This allows making the design and the gear wheel set of the dual clutch transmission more modifiable and therefore allows more readily staying within the limits of the limited space or axial installation height for installing the dual clutch transmission in the motor torque vehicle when modifying an existing dual clutch transmission to a higher number of gears, for instance from 6 forward gears to 7 forward gears.

The dual clutch transmission may for example comprise seven forward gears. According to a preferred embodiment, the partial transmission may comprise a seventh forward gear that has the lowest transmission ratio of all forward gears and a sixth forward gear having the second lowest transmission ratio of all forward gears. It is also possible that a first forward gear and second forward gear may be provided in the same partial transmission. It is important that these two adjacent forward gears comprise transmission ratios where no other transmission ratio of another forward gear comes in between. This may affect the driving comfort of a motor vehicle comprising such a dual clutch transmission, but this influence can be alleviated by appropriate measures that will be described in more detail below.

The invention is not limited to a dual clutch transmission comprising seven forward gears. The dual clutch transmission according to the present invention may also comprise more forward gears (for instance 8 or 9), or may comprise less forward gears (for example 6 gears). It has to be understood that the terms "first partial transmission" and "second partial transmission" are used interchangeably and can be interchanged.

According to a preferred embodiment the loose wheels allocated to the sixth and seventh forward gears are provided side-by-side on a transmission shaft. This shaft may comprise an input shaft that is allocated to the second partial transmission of the dual clutch transmission. Further, the second forward gear and the fourth forward gear may be allocated to the second dual clutch transmission, wherein fixed wheels allocated to these forward gears are supported on this transmission shaft (preferably the input shaft). According to a preferred embodiment, such positioning of the loose wheels and fixed wheels turned out to be a possibility for a particularly compact design in the axial direction of the dual clutch transmission.

The third and the fifth forward gear can be allocated with its respective loose wheels to the first partial transmission, the loose wheels being supported on the same intermediate shaft of the dual clutch transmission. In this connection, the fixed wheels of the first forward gear and of a reverse gear of the dual clutch transmission can be allocated to the first partial transmission, wherein the fixed wheels are supported on this intermediate shaft. The intermediate shaft can be coupled via a second intermediate shaft with the input shaft allocated to the first partial transmission of the dual clutch transmission. According to the structure that has been described above as a preferred embodiment for the second partial transmission a very compact dual clutch transmission with a short axial height can be designed.

Preferably, means are provided for filling the torque transmission gap between two adjacent forward gears during the gear shifting action. Since the two adjacent forward gears are allocated to the same partial transmission, it is not possible to provide in the typical manner torque during the gear shifting in the overlapping transitional phase by engaging both clutches of the dual clutch transmission and change the torque transmission capacity of the two clutches gradually during this transitional phase.

The means for filling in torque and therefore closing the torque transmission gap may be a driving unit that can be designed as comprising at least one electromotor. Preferably, the electromotor may be allocated to the first partial transmission. However, it is also possible that the electromotor interacts with the output shaft that is provided downstream of both partial transmissions.

Another way of providing torque maybe via gear shifting clutches in the second partial transmission for providing a torque during the gear shifting action. One preferred way of providing torque via a gear shifting clutch is via an adjacent forward gear that comprises a lower transmission ratio than the other, adjacent forward gear and to transmit torque via a frictional clutch comprising a high enough torque transmitting capacity for closing at least in part the torque transmission gap during the gear shifting action, the torque from the frictional clutch being high enough for securing a significantly improved driving comfort.

According to the method for controlling the dual clutch transmission, in a first control mode in a gear shifting action shifting gears from one gear allocated to the first partial transmission into a first one of the two adjacent forward gears allocated to the second partial transmission is chosen, and in a second control mode in a gear shifting action shifting gears from one gear allocated to the first partial transmission into a second one of the two adjacent forward gears allocated to the second partial transmission is chosen.

Therefore, upshifting in the first control mode from a lower gear engaged in the first partial transmission, that is in that partial transmission that does not comprise the two adjacent forward gears, one of these two adjacent forward gears in the second partial transmission can be chosen as a target gear, while in the other second control mode, the other one of the two forward gears can be chosen as a target gear. For example, the first control mode might be a control mode for a sportive driving, so that when shifting gears in a dual clutch transmission comprising seven forward gears from the fifth forward gear that forward gear of the second partial transmission is chosen that has the second lowest transmission ratio. This would mean the sixth gear "sport". In an energy saving mode, starting from the fifth forward gear, that target gear with the lowest transmission ratio is chosen. In this case, gear shifting action takes place from the fifth forward gear directly into the seventh forward gear, or in different way to look at it the sixth forward gear "energy-saving".

In the alternative or in addition also when downshifting depending on the chosen driving mode either the one or the other forward gear can be chosen as the target gear.

The first control mode and the second control mode can be chosen by the driver by means of a selector switch. The control mode may also be chosen by an appropriate adaptive logic. Further, the control mode may depend from the present driving situation, in particular from the load (traction or coasting mode, level of the load) or from the torque that is desired by the driver. The driving situation can also depend on the speed of the motor vehicle.

In the first control mode, for instance in case of a high traction load, upshifting from one forward gear to another forward gear may be disabled so that shifting with an interruption in the traction force that would affect the driving comfort is prevented. In the alternative, it is possible to shift into another gear in between in this first control mode. In this case, from one of the two adjacent forward gears, gear shifting takes place first into a forward gear of the first partial transmission, and then without interruption of the traction force back into the second partial transmission into the other adjacent forward gear. In a second or other control mode (for instance when driving at low motor load) upshifting between the adjacent forward gears may take place, accepting interruption in the traction force. In the coasting mode, upshifting may be performed while accepting interruption in the traction force.

Also downshifting may depend on the chosen or present control mode. In the first control mode, for instance in case of high acceleration, starting from the higher one of the two adjacent forward gears as a starting gear a forward gear in the second dual clutch transmission is chosen as a target gear, achieving downshifting without interruption in the traction force. In contrast, in case of a lower load (second control mode) downshifting between the adjacent forward gears can be performed.

Downshifting in the coasting driving situation from the higher one of the two adjacent forward gears (i.e. the second one of the two adjacent forward gears) can always be accomplished into the closest one of the forward gears of the first partial transmission.

When shifting from one of the adjacent forward gears into the other one of the adjacent forward gears, a torque can be provided in the first partial transmission or in the alternative at an output shaft that is provided downstream from the dual clutch transmission. As discussed above, it is for instance possible to provide a torque via an electromotor. Another possibility is to provide a torque in the alternative or in addition in the second partial transmission. This may be accomplished by a gear shifting clutch in one of the adjacent forward gears. If for instance gear shifting is accomplished from the second lowest of the forward gears (e.g. $6^{th}$ forward gear) with the second lowest transmission ratio into the forward gear with the lowest transmission ratio (e.g. 7$^{th}$ forward gear), the gear shifting clutch that is allocated to the gear with the lowest transmission ratio, e.g. the 7$^{th}$ forward gear, gradually increases the torque transmitting capacity under slip. By increasing the contact pressure the torque transmitting capacity of the gear with the lowest transmission ratio, e.g. the 7$^{th}$ forward gear, is increased to the extent that the gear shifting clutch allocated to the gear with the second lowest transmission ration, e.g. the 6$^{th}$ forward gear, can be controlled to be approximately free of torque. In this case means can be provided that disengage the gear shifting clutch of the sixth forward gear when no torque is transmitted any longer. If the gear shifting clutch of the sixth forward gear is disengaged, the gear shifting clutch of the seventh forward gear may accomplish adapting the rotational speed of the loose wheel allocated to the seventh forward gear and of the shaft supporting this loose wheel. Another possibility is to provide the sixth gear with a free-wheel clutch that is activated when shifting from the sixth forward gear into the seventh forward gear when the loose wheel of the sixth forward gear turns practically free from torque transmission.

Based on the embodiments shown in the figures the invention will be explained in further detail in the following.

BRIEF DESCRIPTION OF THE DRAWINGS

In the drawings show.

DETAILED DESCRIPTION OF THE DRAWINGS

Figure 1:
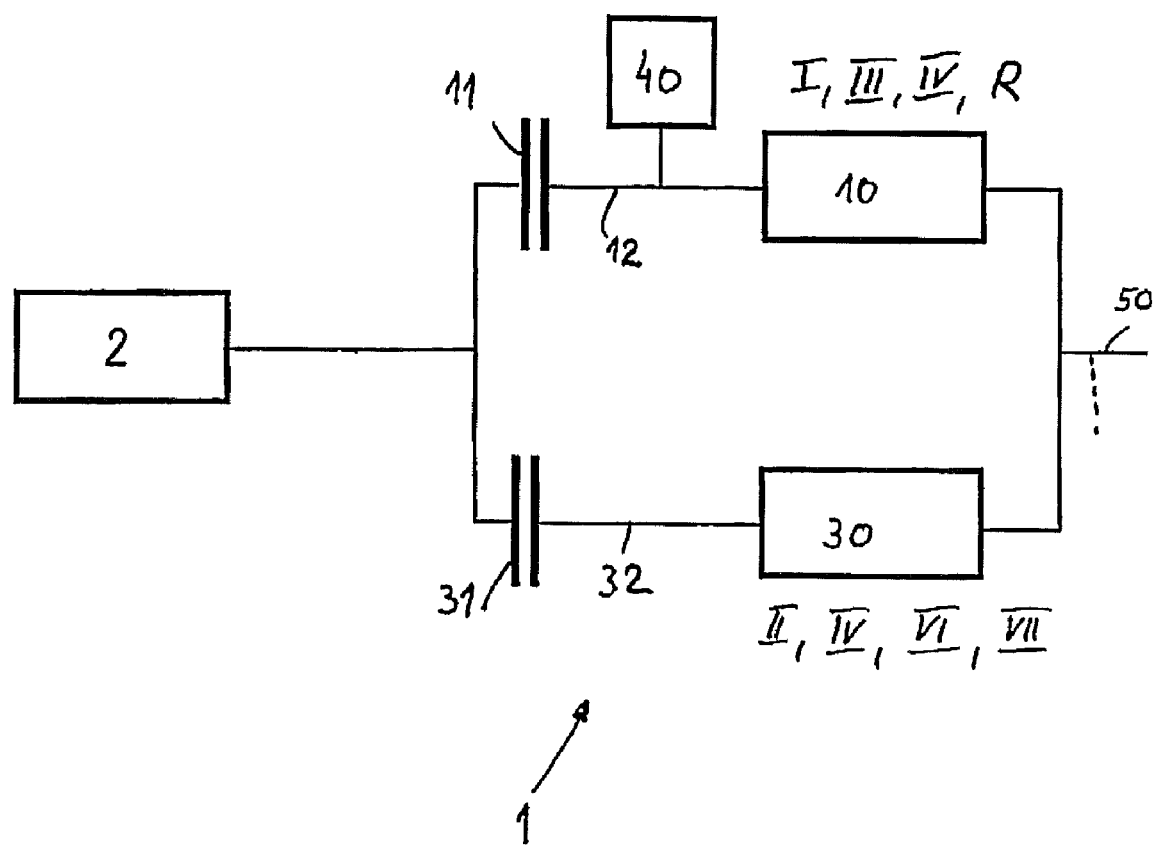
FIG. 1 the schematic structure of the dual clutch transmission according to the present invention.

FIG. 1 shows schematically the design of a dual clutch transmission that is denoted in its entirety by reference numeral 1. The dual clutch transmission 1 comprises a first partial transmission 10 and a second partial transmission 30. A first clutch 11 is allocated to the partial transmission 10, while a second clutch 31 is allocated to the second partial transmission 30. The dual clutch transmission 1 is connected to a motor 2, wherein in case of a closed first clutch 11 a torque is transmitted from the motor 2 onto the input shaft 12 of the first partial transmission 10. In case the clutch 31 is closed, torque is transmitted from the motor 2 via the input shaft 32 into the second partial transmission 30.

The dual clutch transmission shown schematically in FIG. 1 is a dual clutch transmission comprising seven forward gears and one reverse gear R. A first forward gear I, a third forward gear III and a fifth forward gear V are allocated to the first partial transmission 10. In addition, the first partial transmission 10 comprises the reverse gear R. To the second partial transmission 30 a second forward gear II, fourth forward gear IV and a sixth forward gear VI are allocated. Further, the second dual clutch transmission 30 comprises a seventh forward gear VII. The seventh forward gear VII comprises the lowest transmission ratio of the four gears of the dual clutch transmission 1. The second lowest transmission ratio is established by the sixth forward gear VI. The highest transmission ratio of all forward gears is allocated to the first forward gear I. If for instance the first forward gear I is engaged and the first clutch 11 is closed, a torque is transmitted from the motor 2 via the first clutch 11 and the first partial transmission 10 to the output shaft 50. For shifting from the first forward gear I into the second forward gear II, the second forward gear is engaged while the second clutch 21 is still open. Subsequently, a transitional phase where both clutches 11, 31 are engaged follows while in that transition phase the torque transmitting capacity of clutch 11 is reduced and the torque transmitting capacity of the clutch 21 is increased to the point where the first clutch 11 does no longer transmit any torque. At this stage, the transmission of torque is accomplished by the second clutch 31 only and the second partial transmission 30 to the output shaft 50. During the transition phase a torque is transmitted continuously from the motor 2 into the output shaft 50, wherein the torque transmitted from the motor 2 to the output shaft 50 is the sum of partial torques that are transmitted via the first partial transmission 10 and the second partial transmission 30.

When shifting into a higher gear from one forward gear of one of the partial transmission into a forward gear of the other partial transmission, gear shifting can be accomplished as described above without any interruption in the driving power. This is different when shifting into a higher gear from the sixth forward gear into the next higher forward gear, namely the seventh forward gear. Since the sixth and the seventh forward gears are allocated to the same partial transmission 30, it is not possible to rely on a transition phase between engagement of the clutches 11 and 31 for accomplishing gear shifting without interruption in tractive force. For this reason, an electromotor 40 is provided that interacts with the first input shaft 12 of the first partial transmission 10. When the first clutch 11 is open, the electromotor 40 can transmit a torque into the first input shaft 12 that is transmitted further via the first partial transmission 10 into the output shaft 50 if a gear is engaged in the first partial transmission. Therefore, the electromotor 40 can fill the torque transmission gap at the output shaft 50 while gears are shifted from the sixth forward gear VI into the seven forward gear VII at least partially. It is also possible to provide the electromotor 40 downstream from the first partial transmission 10 so that the electromotor interacts directly with the output shaft 50. The interrupted line at the output shaft 50 depicts this.

Figure 2:
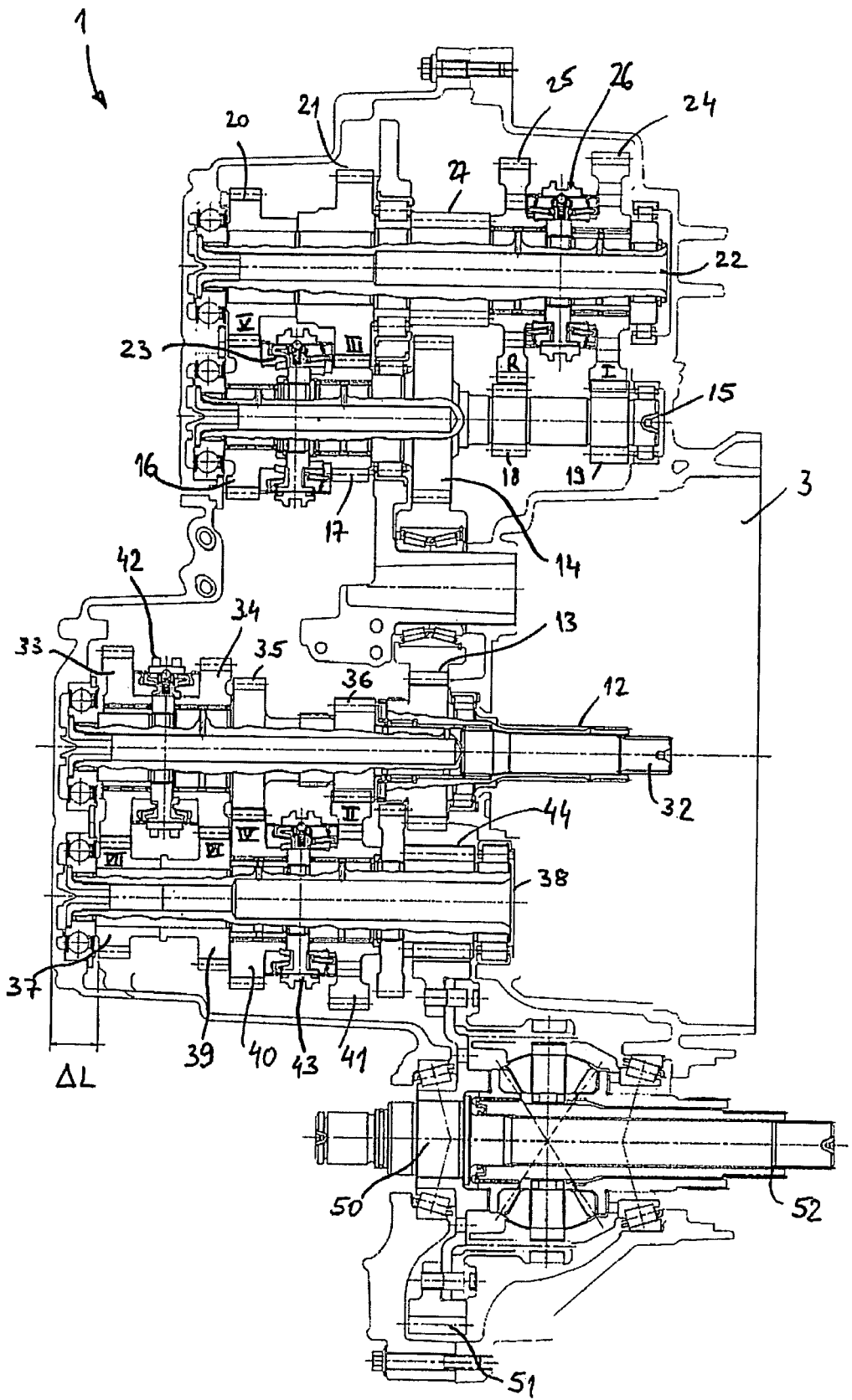
FIG. 2 a longitudinal section of an embodiment of the dual clutch transmission according to the present invention.

FIG. 2 shows a longitudinal section of a preferred embodiment of the dual clutch transmission according to the present invention. Elements in FIG. 2 that correlate to the elements shown in FIG. 1 are denoted with the same reference numerals. Also in FIG. 2 the entire dual clutch transmission is denoted with reference numeral 1. The dual clutch transmission shown in FIG. 2 comprises an input shaft 12 that is designed as a hollow shaft and comprises a second input shaft 32 that is coaxial in relation to the first input shaft. The clutches 11 and 31 of the dual clutch transmission as shown in FIG. 1 are not shown in FIG. 2, but it is to be noted that these are accommodated in a clutch housing.

The second input shaft 32 supports two loose wheels 33 and 34 as well as two fixed wheels 35 and 36. The loose wheel 33 is engaged by the fixed wheel 37 that is supported on the output shaft 38 of the second partial transmission 30. In addition to the fixed wheel 37 a further fixed wheel 39 is provided that is engaged by the loose wheel 34. In addition, the output shaft 38 carries two loose wheels 40, 41 that are engaged by the fixed wheels 35, 36 of the second input shaft 32. The loose wheels 33, 44 can be connected by a gear shifting clutch 42 in a fixed, non-rotatable manner in relation to the second input shaft 32 with that the second input shaft. Likewise, a further gear shifting clutch 43 is provided on the output shaft 38 allowing to establish a fixed, non-rotatable connection of the loose wheels 40, 41 with the output shaft 38. If for instance the loose wheel 33 is connected via the gear shifting clutch 42 in a fixed manner with the second input shaft 32 the seventh forward gear VII is engaged. In the same manner, also the forward gears II, IV and VI can be engaged, wherein a shifting sleeve is shifted by the respective gear shifting clutches 42, 43 in axial direction.

While the loose wheel 34 is allocated to the sixth forward gear, the loose wheels 40, 41 that are provided on the output shaft 38 are allocated to the forward gears II and IV.

The first input shaft 12 is connected via the gear wheels 13, 14 with an intermediate shaft 15 that supports the two loose wheels 16, 17 and the two fixed wheels 18, 19. The loose wheels 16, 17 are engaged by the fixed wheels 20, 21 that are supported on another output shaft 22 of the dual clutch transmission 1. Via a gear shifting clutch 23 a fixed, non-rotatable connection can be established for example between the loose wheel 16 and the intermediate shaft 15. This engages the fifth forward gear V. By means of the gear shifting clutch 23 the third forward gear III can be engaged. The fixed wheel 19 is engaged by a loose wheel 24 that is supported on the output shaft 22. Between the fixed gear 18 and a loose gear 25 that is provided on the output shaft 22 an intermediate gear is provided. If the loose wheel 25 is connected via a gear shifting clutch 26 in a fixed, non-rotatable manner with the output shaft 22, the reverse gear R of the dual clutch transmission is engaged via the gear wheel pair comprising the fixed wheel 18 and the loose wheel 25 via the intermediate wheel. The gear shifting clutch 26 is also provided for engaging the first forward gear.

The output shaft 32 as well as the output shaft 22 are engaged by a gear wheel 51 that is supported on the output shaft 50 as a part of a differential gear 52. FIG. 2 does therefore show a view where the shafts 12, 32 and 22, 38 are rotated into the drawing plane. In reality though, these two shafts are not in the same plane, but are located such that as described above the output shafts 22, 32 are engaged via gear wheels 27, 44 provided on the output shafts with the gear wheel 51.

The seven-gear dual clutch transmission 1 according to FIG. 1 is based on a dual clutch transmission comprising six forward gears, wherein the seventh forward gear VII is simply placed adjacent to the sixth forward gear VI. By adding the seventh forward gear VII the axial length of the transmission is increased by the amount ΔL. Apart from that the dual clutch transmission 1 of FIG. 2 differs from the original six-gear dual clutch transmission in that a gear shifting clutch 42 acting in both directions is provided, allowing to engage the sixth forward gear VI and the seventh forward gear VII, respectively. Apart from minor modifications of the shafts 32, 38 there are no differences between the dual clutch transmission shown in FIG. 2 and the underlying base dual clutch transmission of FIG. 2 comprising six forward gears. It is noted that a relatively simple modification of the six-gear dual clutch transmission is required for modifying it into a seven-gear dual clutch transmission.

LIST OF REFERENCE NUMERALS 1 dual clutch transmission
2 motor
3 clutch housing
10 first partial transmission
11 first clutch
12 first input shaft
13 gear wheel
14 gear wheel
15 intermediate shaft
16 loose wheel
17 loose wheel
18 fixed wheel
19 fixed wheel
20 fixed wheel
22 first output shaft
23 gear shifting clutch
24 loose wheel
25 loose wheel
26 gear shifting clutch
27 gear wheel
30 second partial transmission
31 second clutch
32 second input shaft
33 loose wheel
34 loose wheel
35 fixed wheel
36 fixed wheel
37 fixed wheel
38 second output shaft
39 fixed wheel
40 loose wheel
41 loose wheel
42 gear shifting clutch
43 gear shifting clutch
44 gear wheel
50 output shaft
51 gear wheel
52 differential gear

What is claimed is:

1. A dual clutch transmission comprising:
a first partial transmission; and
a second partial transmission, wherein
a first group of forward gears is allocated to the first partial transmission,
a second group of forward gears is allocated to the second partial transmission,
each one of the forward gears comprises a particular transmission ratio,
two adjacent forward gears comprise adjacent transmission ratios with no transmission ratio of any other forward gear in between,
at least two adjacent forward gears are allocated to the second partial transmission; and
an electromotor as a driving unit for filling the torque transmission gap during the gear shifting action between two adjacent forward gears.

2. The dual clutch transmission according to claim 1, wherein the means for filling the torque transmission gap is a gear shifting clutch of one of the first and second partial transmissions.

3. The dual clutch transmission according to claim 1, wherein the means for filling the torque transmission gap is a frictional clutch.

4. The dual clutch transmission according to claim 1, wherein the means for filling the torque transmission gap is allocated to the first partial transmission.

5. The dual clutch transmission according to claim 1, further comprising a selector switch for selecting between a sportive driving mode enabling gear switching between a gear in the first partial transmission into a first one of the two adjacent gears in the second partial transmission, and an energy-saving driving mode enabling gear shifting between a gear in the first partial transmission into a second one of the two adjacent gears in the second partial transmission, wherein the transmission ratio of the first one the two adjacent gears is higher than the transmission ratio of the second one of the two adjacent gears.

6. The dual clutch transmission according to claim 5, further comprising detectors for determining the driving conditions motor load and driving speed, and an inhibitor inhibiting gear shifting from a gear in the first partial transmission into either the first or second one of the two adjacent gears depending on the driving conditions that were determined.

7. The dual clutch transmission according to claim 1, further comprising detectors for determining driving conditions motor load and driving speed, and an adaptive logic selecting between a sportive driving mode enabling gear shifting between a gear in the first partial transmission into a first one of the two adjacent gears in the second partial transmission, and an energy-saving driving mode enabling gear shifting between a gear in the first partial transmission into a second one of the two adjacent gears in the second partial transmission, wherein the transmission ratio of the first one the two adjacent gears is higher than the transmission ratio of the second one of the two adjacent gears.

\* \* \* \* \*